INVENTOR
KARL GUSTAV AHLEN

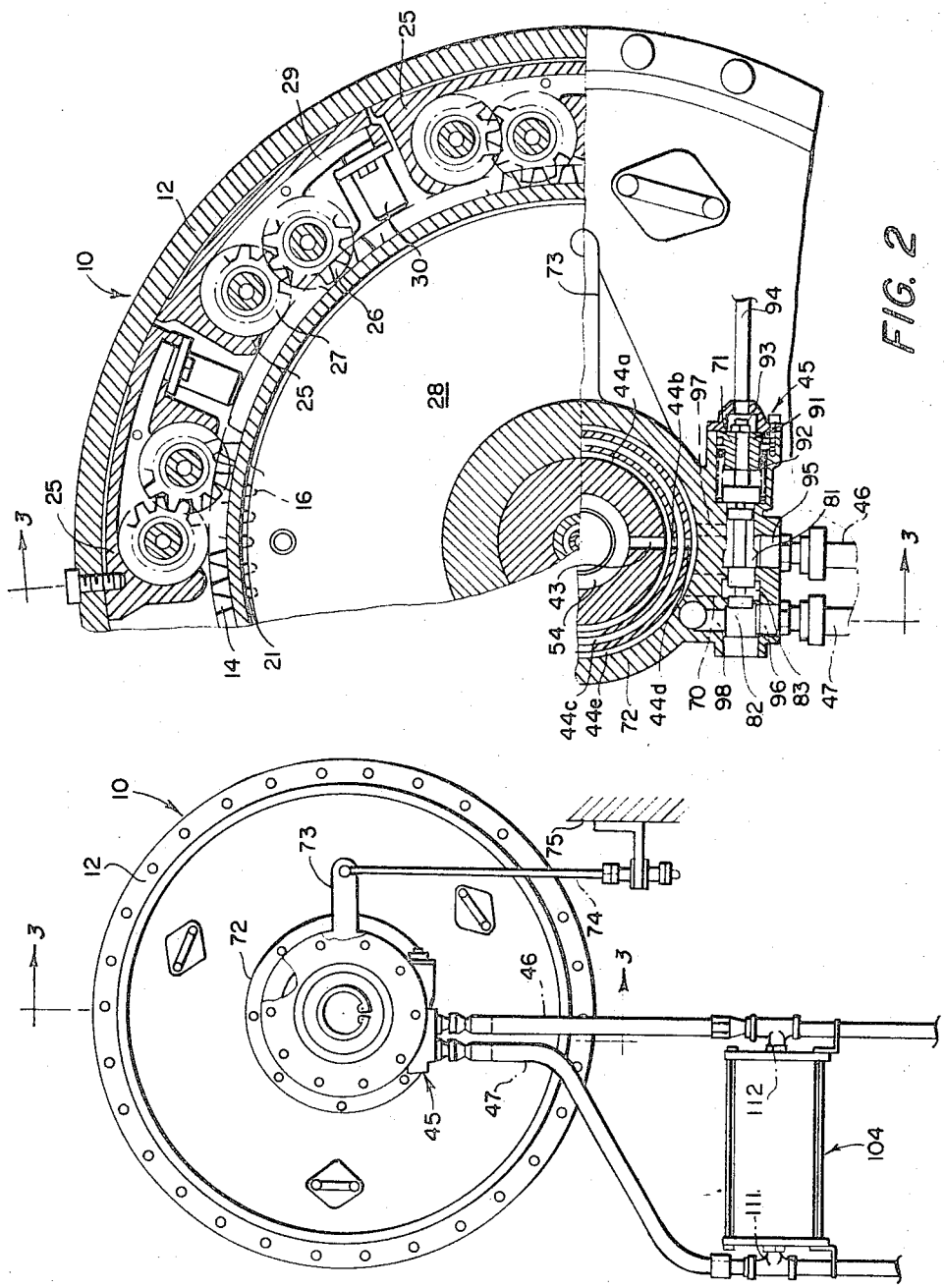
Dec. 17, 1968   K. G. AHLEN   3,416,636
REMOTE CONTROL ARRANGEMENT FOR POWER TRANSMISSION
Filed Nov. 17, 1966   3 Sheets-Sheet 1
INVENTOR
KARL GUSTAV AHLEN
BY Larson and Taylor
ATTORNEYS

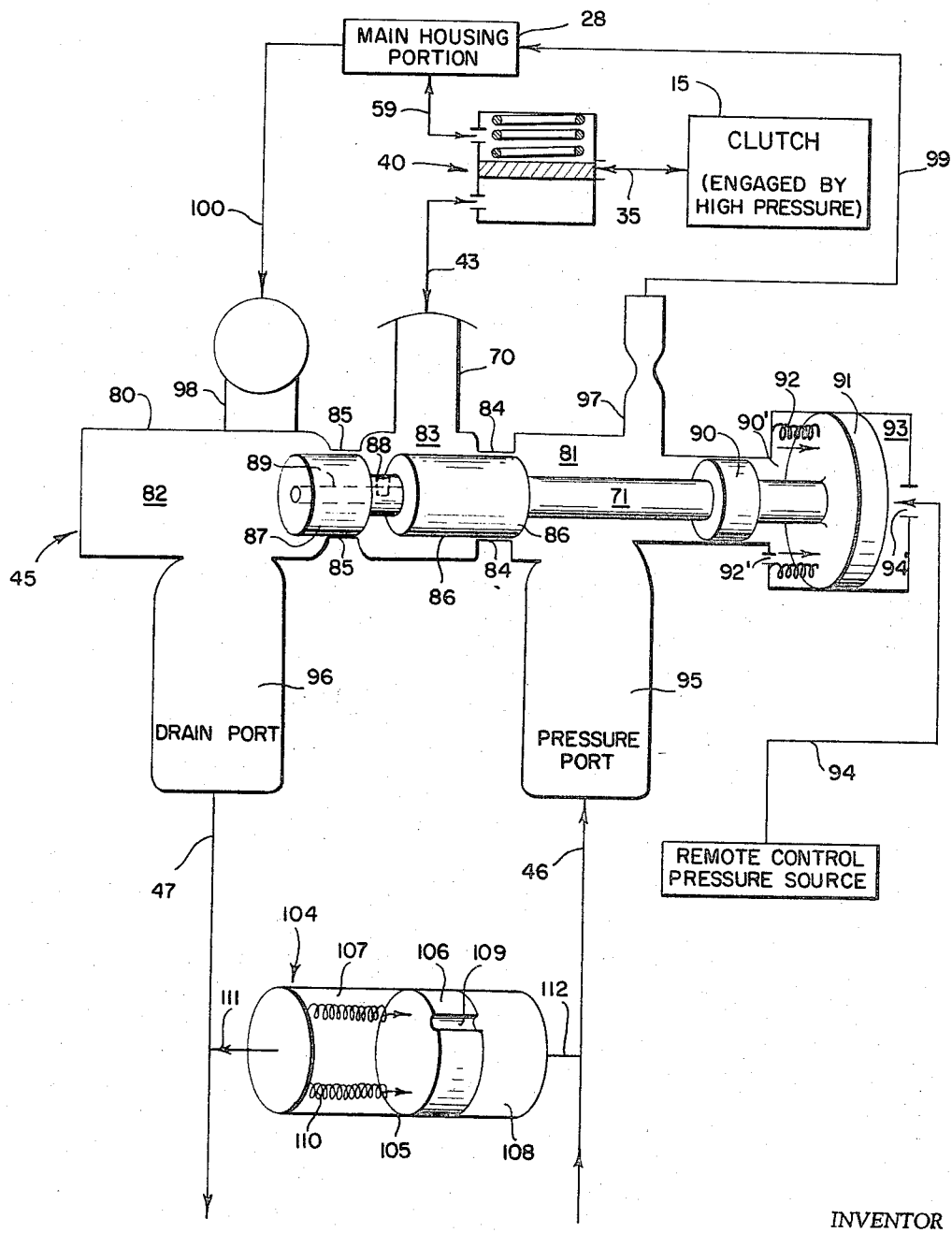

United States Patent Office 3,416,636
Patented Dec. 17, 1968

3,416,636
REMOTE CONTROL ARRANGEMENT FOR POWER TRANSMISSION
Karl G. Ahlen, Stockholm, Sweden, assignor to S.R.M. Hydromekanik AB, Stockholm, Sweden
Filed Nov. 17, 1966, Ser. No. 595,263
Claims priority, application Great Britain, June 28, 1966, 28,952/66
9 Claims. (Cl. 192—57)

ABSTRACT OF THE DISCLOSURE

A power transmission mechanism including a hydrostatic coupling and a mechanical coupling. The mechanical coupling is actuated by a hydraulic piston operated by pressurized fluid derived from a source external to the mechanism. The flow of this pressurized fluid through a central valve to the hydraulic piston is controlled by a fixed servo valve. This servo also includes an arrangement for continuously circulating fluid through the mechanism; and also an arrangement for providing make-up pressurized fluid.

---

This invention relates to a power transmission mechanism for transmitting power between two rotating shafts and in particular it relates to a transmission mechanism comprising both a hydrostatic coupling and a mechanical clutch device.

The type of transmission mechanism to which the present invention relates is shown in U.S. Patent No. 3,258,093. In the arrangement shown in this patent one shaft is connected to an outer housing, the other shaft is connected to a central gear, and the power transmission occurs between the housing and the central gear. A plurality of gear pump units are rotatably mounted within the outer housing, the pump gears being moveable by interengagement with the central gear. By controlling the flow of fluid from the high pressure side of these gear pumps back to the low pressure portion of the housing it is possible to control the degree of coupling between the outer housing and the central gear. Specifically, if the said passage is left wide open, then the central gear will merely turn the pump gears to circulate fluid therethrough, and no mechanical coupling will be effected. However, if the passage from the high pressure side of the pump to the low pressure portion of the housing is closed, then pressure will build up on the high pressure side of the pump until the pump gears can no longer turn. When this occurs the portion of the gear pump engaged with the central gear will turn therewith, thereby coupling the outer housing to the central gear.

The valve controlling flow of fluid from the high pressure side of the gear pumps back to the low pressure side of the housing thus controls the operation of the hydrostatic coupling. However, even if this valve is opened completely so that the pumps can act to circulate fluid without restriction, complete elimination of the coupling effect is not achieved. Owing to dynamic and viscous resistance torque is transmitted through the fluid between the relatively rotating coupling parts, the driven part of the coupling will be caused to rotate, resulting in a considerable torque transmission.

In order to bring about a complete disengagement of the hydrostatic coupling there is shown in Patent No. 3,207,279 a power transmission mechanism wherein a mechanical clutch is provided in series with the hydrostatic coupling so that both the hydrostatic coupling and the mechanical clutch must be engaged to provide transmission of torque between two rotary shafts. In the said Patent 3,207,279 the engagement of the mechanical clutch is controlled by pressure from the high pressure side of the gear pumps.

The present invention is directed to the type of power transmission mechanism including both a hydrostatic coupling and a mechanical clutch device. In particular the present invention is directed to an improved arrangement for controlling the engagement of the mechanical clutch.

The present invention also includes a means for circulating fluids through the low pressure portion of the chamber continuously, such as, for example, for cooling purposes.

In the arrangement shown in Patent 3,207,279 a hydraulic piston controls engagement of the mechanical clutch, and engagement thereof is controlled by fluid from the high pressure side of the hydrostatic coupling gear pumps. In the present arrangement, however, the control is provided by external means so that remote control operation of the mechanical clutch will be possible.

Briefly, the present invention is provided in a power transmission having a first shaft connected to the outer housing and a second shaft having a portion which projects into the housing and is coaxial with the first shaft. A plurality of gear pump units are spaced about the inner periphery of the housing. Each of these gear pump units comprises a main gear and an idler gear. The main gears are in engagement with a main central sun gear which is rotatable around the axis of the transmission mechanism. In the basic hydrostatic coupling device this sun gear would be connected directly to the second shaft. In the present invention however, this sun gear which is annular in shape, is connected at its inner surface to teeth on the other periphery of an outer clutch disc which forms a part of a clutch assembly. The inner clutch discs of this clutch assembly is non-rotatably connected to the second shaft. The clutch device also includes a clutch piston which, when subjected to high pressure, will cause engagement of the inner and outer clutch discs, thereby coupling the said sun gear to the second shaft. Also, if the valves of the gear pump units are closed so that the pumps no longer pump fluid, then the main pump gears would not rotate about their own axes. But since the main pump gears are engaged with the sun gear, the pump units would be carried around on the periphery of the sun gear. Consequently, the outer housing would be coupled with the second shaft.

Control of fluid to the clutch piston is provided by a central control valve mechanism located on the axis of the transmission mechanism.

According to the present invention there is provided a servo valve mechanism for controlling flow of fluid from a high pressure source to the central valve. The movement of the servo valve can be controlled by any exterior means such as a separate source of power fluid, an electric solenoid, etc. This servo valve is so constructed that it not only controls the flow of fluid to the central valve but it also allows fluid to flow from the servo mechanism, bypassing the valve, directly to the low pressure portion of the housing and also from the low pressure portion of the housing back through the servo mechanism to drain.

According to another feature of the invention there is provided a makeup means connected to the high pressure pipe leading into the servo mechanism, the purpose of such makeup means being to assure that a sufficient pressure is maintained at all times in the high pressure pipe leading to the servo mechanism. This makeup means may be a piston and cylinder connected between the high pressure pipe leading to the servo mechanism and the drain pipe therefrom. The drain connection prevents the pressure in the cylinder from exceeding predetermined level.

Thus, it is an object of this invention to provide an improved hydrostatic and mechanical transmission mechanism wherein accurate positive engagement and disengagement of the mechanical clutch device can be selectively controlled by means remote from the transmission mechanism itself.

It is another object of this invention to provide a hydrostatic and mechanical transmission mechanism which overcomes many disadvantages of previous hydrostatic and mechanical transmission mechanisms.

It is still another object of this invention to provide a power transmission mechanism wherein a single control unit serves the dual function of (1) controlling flow of pressure fluid to a clutch piston for initial engagement and (2) providing continuously circulating fluid such as cooling fluid, through the transmission housing.

Other objects and the attendant advantages of the present invention will become more apparent from the detailed description to follow together with the accompanying drawings of a preferred embodiment of the invention wherein:

FIGURE 1 is an end elevation view of a power transmission according to the present invention.

FIGURE 2 is a partial sectional view taken along line 2—2 of FIGURE 3 and illustrating a portion of the power transmission and of the servo valve mechanism in the present invention.

FIGURE 4 is a schematic view illustrating diagrammatically the servo valve mechanism and illustrating the flow of fluid to and from the servo mechanism.

Figure 3:
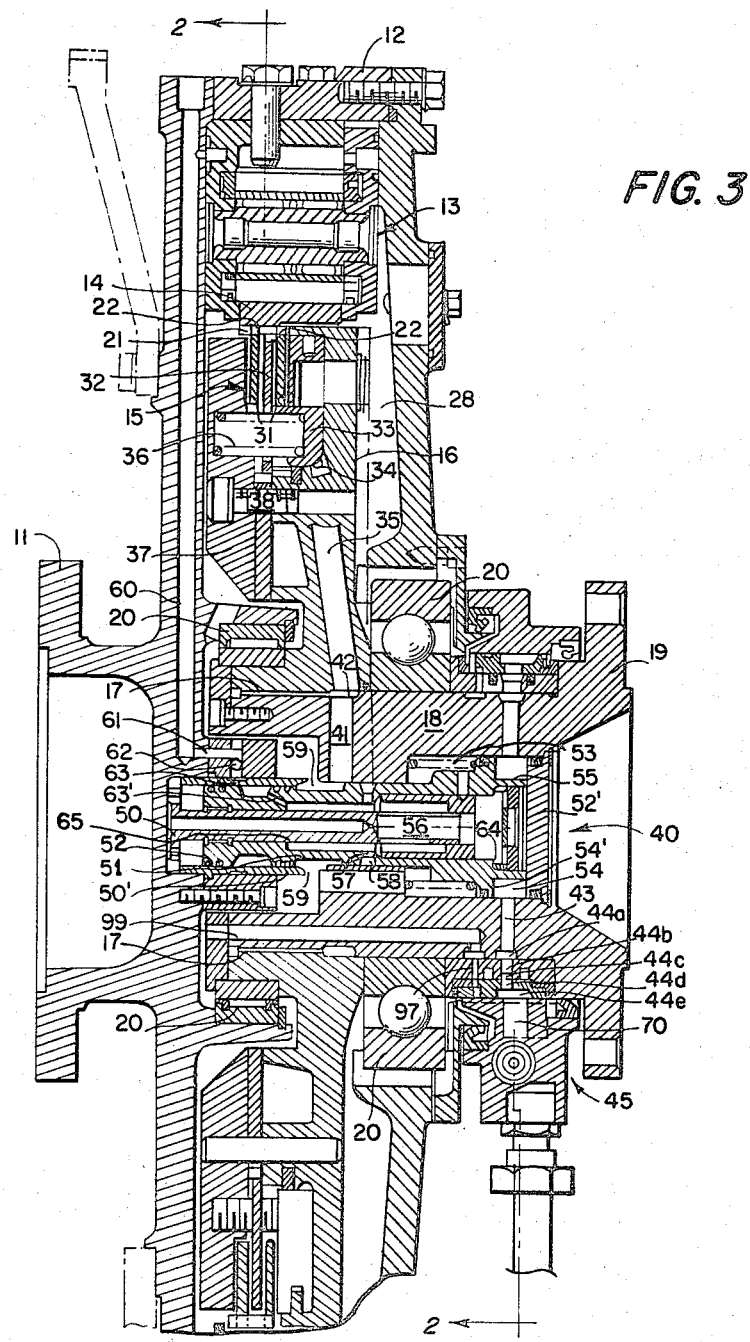
FIGURE 3 is a sectional view of a hydrostatic coupling and mechanical clutch transmission mechanism according to the present invention, taken along lines 3—3 of FIGURES 1 and 2.

Referring to FIGURES 1 through 3, and in particular to FIGURES 2 and 3 there is shown a power transmission mechanism 10. For purposes of illustration the side of the transmission at flange 11 will be considered to be the primary or input side of the transmission. This flange 11 is integrally formed on the outer housing 12. A hydrostatic coupling device shown generally at 13 transmits power from the outer housing 12 to an annular central sun gear 14. This annular sun gear 14 is engaged with a mechanical clutch 15 which is in turn selectively engaged with a central annular member 16 which is in turn connected through spline connection 17 to the second shaft 18. For purposes of illustration, shaft 18 will be considered as the output shaft. A flange 19 on output shaft 18 is provided for connecting the output shaft 18 to another rotatable member. Suitable roller bearings such as 20 are provided for allowing relative rotational movement between the outer housing 12 and the output shaft 18.

Referring now to FIGURE 2 there is shown a plurality of pump units 25 rigidly secured to the outer housing 12 and containing a first, or main pump gear 26, and a second, or idler pump gear 27. The entire housing portion radially inwardly of the pump units, indicated generally at 28, is at low pressure. When the main gear 26 is made to turn counter clockwise, and thus the idler gear 27 clockwise, fluid is pumped from the low pressure portion 28 of the housing to the high pressure side 29 of the pump 25. A maximum pressure valve 30 is provided to regulate the pressure at which the fluid in passage 29 will be allowed to flow back to the chamber 28.

Assuming that the annular sun gear 14 is at first stationary and the primary shaft is made to turn outer housing 12, and assuming that the valve 30 is wide open to permit full flow of fluid from chamber 29 to chamber 28, then the gears 26 will simply roll around the annular gear 14 as fluid is merely circulated from chamber 28 to chamber 29 and back to 28. However, if valve 30 is closed the pressure in chamber 29 will build up until the pump unit 25 can no longer pump fluid into the chamber 29. At this point the gear 26 practically cannot turn. Thus rather than roll around annular gear 14, the gears 26 will then carry annular sun gear 14, causing gear 14 to rotate with the outer housing. In this manner, full coupling is provided between outer housing 12 through the gear pump units 25 to the annular gear 14.

However, as noted earlier, even if the valve 30 is wide open there will be some coupling between the gears 26 and the central gear 14 because of the pressure drop as the fluids pass through the gear pumps. To offset this drag, rather than connect the annular sun gear 14 directly to the output shaft 18, it is connected instead to a mechanical clutch mechanism 15, and the mechanical clutch is in turn connected to the output shaft 18.

Internal teeth 21 on the inside of gear 14 are engaged with outwardly extending teeth 22 on outer clutch discs 31. Positioned between outer clutch discs 31 is an inner clutch disc 32 which is rigidly secured to central annular member 16 by a screw 38. A hydraulic clutch piston 33 is selectively urged to the left by high pressure fluid within high pressure chamber 34 to cause engagement of the outer clutch discs 31 with the inner clutch disc 32 thereby providing coupling from the annular sun gear 14 to the inner annular member 16 and thus through spline 17 to output shaft 18.

The supply of fluid to chamber 34 is transmitted through a radial passage 35, annular passage 42 and radial passage 41 leading to the central valve 40. A spring 36 acts against a member 37 which is fixed to the member 16 to urge the clutch piston 33 to the clutch disengaged position. The flow of pressure fluid to passage 35 is controlled by the central valve 40. This central valve 40 in turn receives the pressure fluid through radial passage 43 in the output shaft, passages 44a through 44e, and passage 70 from servo mechanism 45. Pressure fluid is delivered to and from the servo mechanism 45 by inlet passage 46 and outlet passage 47 respectively.

The central valve 40 comprises a non-slidable core member 50 and a non-slidable sleeve member 50'. Surrounding member 50 but within sleeve 50' is a slidable member 51 having suitable sealing rings 52 between it and the sleeve 50'. An end member 52' seals the end of the central valve 40. A spring 53 urges the slidable member 51 to the right (as viewed in FIGURE 3) so that its end 55 engages the end member 52. An annular recessed area 54 at the right hand end of slidable member 51, together with end member 52', forms an annular space which receives the pressure fluid from the servo mechanism 45. The left side of annular area 54 is a reaction surface 54'.

Within the slidable member 51 is central pressure area 56 in communication with a radial port 57 and an annular port 58. When pressure fluid enters area 54 it exerts a force on reaction surface 54' urging the member 51 to the left. Pressure fluid then flows around the right end 55 of the member 51, into the chamber 56, through passages 57 and 58 into passages 41, 42 and then to passage 35 and to the hydraulic clutch piston cylinder 34. In this manner pressure fluid is conducted through the central valve 40 to the clutch piston 33 to cause the clutch discs 31 and 32 to engage.

To disengage the clutch 15 the pressure within area 54 is relieved (in a manner to be discussed in more detail below) so that spring 53 urges the slidable member 51 back to the right. At this time the pressure fluid within passages 41, 42, 35 and 34 enters annular drain groove 59 from which the fluid passes to the low pressure portion 28 of the housing.

There is also provided in the housing a channel 60 for supplying pressure fluid to the high pressure chamber 56 separate from the fluid received from the servo mechanism 45. This pressure fluid passes through channel 61, one-way valve 62, opening 63 in the sleeve 55 and then through passage 63' to the central pressure area 56. This fluid then acts upon several reaction surfaces on the member 51, for example surfaces 64 and 65, to urge the member 51 to the left so that annular groove 58 becomes aligned with channel 41 so that fluid can flow through the passages 41 and 35 to clutch piston cylinder 34.

The servo mechanism 45 is best shown structurally in FIGURE 2 and schematically in FIGURE 4. FIGURE 4 also illustrates the relationship between the servo mechanism 45 and the remainder of the power transmission mechanism.

The servo valve comprises, essentially, three chambers, a high pressure chamber 81, a drain chamber 82 and a control chamber 83. Chambers 81 and 83 are partially separated by a raised annular shoulder 84 while chambers 82 and 83 are partially separated by a raised annular shoulder 85. A slidable valve member 71 is slidably mounted within chamber 80. The member 71 has a first raised cylindrical portion 86 adjacent raised shoulder 84 and acting to separate chamber 81 from the chamber 83. A second raised cylindrical portion 87 adjacent raised shoulder 85 separates the chamber 82 from chamber 83. A radial passage 88 and an axial passage 89 connect chamber 83 to drain chamber 82.

The axial movement of the slidable valve member 71 is provided by the control portion of the servo mechanism located to the right of a raised cylindrical portion 90 which closes off the pressure chamber 81. The control portion includes a raised cylindrical piston 91 rigidly connected to member 71 and separating a chamber 90', having an aperture 92' to atmosphere, from a servo control chamber 93 on the opposite side of piston 91. A spring 92 is provided to urge the piston 91, and thus the slidable member 71 to the right, while pressure fluid selectively provided along line 94 through opening 94' to the chamber 93 is provided to urge the piston 91, and thus the slidable member 71, to the left.

Pressure fluid is supplied to chamber 81 through pressure port 95 while drain is provided from the chamber 82 through drain port 96. A passage 70 leads from chamber 83 to the central valve 40 and subsequently to the clutch 15.

The servo mechanism also contains a means for continuously circulating fluid received from pressure line 46 to the low pressure portion 28 of the housing 12. A restricted passage 97 leads from the pressure chamber 81 to axial passage 99 (see FIGURE 3) to the area 28. Also, fluid flows at all times from the portion 28 of the housing along line 100 to drain port 98 in communication with drain chamber 82. Line 100, shown schematically in FIGURE 4 may be structurally identical to the passage 99 in FIGURE 3. It is to be noted that openings 97 and 98 are so positioned in the servo mechanism that they remain open to their respective servo valve chambers irregardless of the axial position of slidable member 71.

According to another feature of the present invention, a makeup cylinder 104 is provided to assure that the pressure of the fluid in passage 46 stays at a predetermined level. The makeup cylinder comprises an outer cylindrical housing 105 having a slidable piston 106 mounted therein. A pressure chamber 108 on one side of the piston is connected to line 46 through pipe 112 while a drain chamber 107 on the other side of the piston 106 is connected to drain passage 47 through connecting pipe 111. Fluid in passage 46 enters pressure chamber 108 through connection 112 and the predetermined pressure in chamber 108 is provided by urging the piston 106 to the right by means such as compression spring 110. Thus, in the event that pressure within line 46 drops slightly below the predetermined level, the piston 106 would be urged to the right thereby making up the lost pressure. There is also provided a rsetricted passage 109 in piston 106 so that some of the fluid in chamber 108 will bleed outwardly therefrom into chamber 110 and through pipe 111 to drain passage 47.

The position of the servo mechanism on the power transmission is shown in FIGURE 1. The servo mechanism 45 is connected to a stationary ring 72 having a rigid bar 73 which is connected by a link means 74 to a fixed member 75. FIGURE 1 also shows the position of makeup cylinder 104 between the inlet pipe 46 and the outlet pipe 47.

The servo mechanism 45 operates in the following manner. Referring to FIGURE 4, pressure fluid is constantly supplied along pipe 46 to port 95 and constantly drained from port 96 to pipe 47. Even if no pressure fluid is being conducted to the central valve 40 for engaging the clutch 15, still, pressure fluid will circulate to the main housing portion 28 through passages 46, 95, 81, 97 and 99 to 28 and from 28 to drain through passages 100, 98, 82, 96 and 47.

To engage the clutch, pressure fluid is passed along line 94 to chamber 93. Pressure fluid in this chamber then urges the piston 91 to the left against the force of spring 92 thereby urging slidable member 71 to the left. The raised cylinder portion 86 will then move to the left opening a passage between chambers 81 and 83 and closing the passage between chambers 82 and 83. The pressure fluid will then flow through passage 70, and through passages 43 and 44a–e to central valve 40 from which it will flow to the clutch 15 in the manner discussed earlier.

To disengage the clutch the pressure in chamber 93 is reduced, as a result of which slidable member 71 moves to the right under the influence of spring 92, allowing the pressure fluid within chamber 70 and 83 to be drained through passages 88 and 89 to drain chamber 82 and drain port 96 to drain pipe 47. When the pressure within lines 43, 44a–e and 70 has been relieved, the pressure within annular chamber 54 will also be relieved, as a result of which the member 51 of the central valve will move to the right under the influence of spring 53, thereby allowing fluid to flow from the clutch 15 through annular drain port 59 to the main portion 28 of the housing which is at drain, or low pressure.

The invention has been discussed in considerable detail above with respect to a preferred embodiment thereof. However, it should be apparent that the invention is capable of numerous modifications and variations entirely within the spirit and scope of the invention as defined by the appended claims within.

I claim:

1. A power transmission mechanism for transmitting power between first and second rotatable shafts comprising: an annular housing connected to the first shaft, the second shaft having a portion located within said housing, a body of fluid within said housing, a hydrostatic coupling within and engaging said housing and selectively operable to cause driving engagement between said outer housing and said second shaft, a mechanical clutch means connected between the interior of said hydrostatic coupling and said second shaft, a hydraulic piston means for controlling engagement of said mechanical clutch and thereby drivingly engaging said hydrostatic coupling with said second shaft, and including a control means for directing pressurized fluid from a source separate and distinct from the body of fluid within the housing to control the movement of the said hydraulic piston, said control means including a movable central valve located within the housing coaxially about the axis of rotation of the second shaft, at least one radially extending passage from said central valve to said hydraulic piston, a servo valve fixed against movement relative to either of said first or second shafts for controlling the flow of said separate pressurized hydraulic fluid to the said central valve for moving the central valve to permit the said separate pressurized hydraulic fluid to flow through the said central valve and through the said at least one radially extending passage to the hydraulic piston to operate the mechanical clutch.

2. A power transmission mechanism as claimed in claim 1 wherein said servo valve also includes a means for providing continuous flow of the said separate pressurized fluid to and from the body of fluid within the housing.

3. A power transmission as claimed in claim 1 wherein said body of fluid in the housing is associated with the said hydrostatic coupling, and wherein said servo also includes a means for providing continuous flow of said separate pressurized fluid to and from the body of fluid within the housing.

4. A power transmission mechanism as claimed in claim 3 including an inlet pipe from said source of separate pressurized fluid to the servo valve and an outlet passage from said servo valve to drain, and a makeup means connected to said inlet pipe for maintaining the fluid therein at a predetermined pressure.

5. A power transmission mechanism for transmitting power between first and second rotatable shafts comprising: a housing connected to the first shaft, a body of low pressure fluid within the housing, the second shaft having a portion located within said housing, mechanical clutch means for causing selectively operative engagement of the said first and second shafts, hydraulic piston means for controlling engagement of the said clutch, a first valve for controlling flow of pressure fluid to and from the said hydraulic piston, and a servo valve responsive to a control force for controlling the flow of pressure fluid to the said first valve; said servo valve comprising a high pressure chamber and a drain chamber, each in selective communication with a control chamber, said high pressure chamber including an inlet port for receiving high pressure fluid, and a restricted passage to the body of low pressure fluid within the housing, said control chamber including a port in communication with said first valve, and said drain chamber including an opening for receiving fluids from the body of low pressure fluid within the housing and an outlet port for delivering fluids to drain, a slidable valve member slidable within said chambers for selectively connecting the control chamber in a first position to the high pressure chamber and in a second position to the drain chamber, wherein both the said restricted passage from the high pressure chamber and the said opening to the drain chamber are open to permit flow of fluids therethrough in both the first and second positions of the slidable member.

6. A power transmission mechanism as claimed in claim 5 wherein the said control force is a hydraulic pressure force derived from a pressure fluid separate from the fluids within the power transmission mechanism.

7. A power transmission mechanism for transmitting power between first and second rotatable shafts comprising: a housing connected to the first shaft, a body of low pressure fluid within the housing, the second shaft having a portion located within said housing, mechanical clutch means for causing selectively operative engagement of the said first and second shafts, hydraulic piston means for controlling engagement of the said clutch, a first valve for controlling flow of pressure fluid to and from the said hydraulic piston, and a servo valve responsive to a control force for controlling the flow of pressure fluid to the said first valve; and including an inlet passage connecting a source of pressure fluid to the servo valve and an outlet passage connecting the servo valve to drain, a pressure fluid makeup means comprising a hydraulic cylinder in fluid communication at one end with the said inlet passage and in fluid communication at its other end with said outlet passage, a piston in said hydraulic cylinder forming a pressure chamber with that part of the hydraulic cylinder which is connected to the inlet passage, and resilient means acting on the piston tending to counter the force of the pressure fluid within the pressure chamber, and a restricted passage in said piston for permitting fluid to flow across said piston from said pressure chamber to said outlet passage.

8. A power transmission mechanism as claimed in claim 7 wherein said servo valve also includes a means for providing continuous flow of the said pressure fluid to and from the body of fluid within the housing.

9. A power transmission mechanism as claimed in claim 8 wherein said servo valve comprises a high pressure chamber and a drain chamber, each in selective communication with a control chamber, said high pressure chamber including an inlet port for receiving high pressure fluid, and a restricted passage to the body of low pressure fluid within the housing, said control chamber including a port in communication with said first valve, and said drain chamber including an opening for receiving fluids from the body of low pressure fluid within the housing and an outlet port for delivering fluids to drain, a slidable valve member slidable within said chambers for selectively connecting the control chamber in a first position to the high pressure chamber and in a second position to the drain chamber, wherein both the said restricted passage from the high pressure chamber and the said opening to the drain chamber are open to permit flow of fluids therethrough in both the first and second positions of the slidable member.

References Cited

UNITED STATES PATENTS

| 2,564,848 | 8/1951 | Jessup | 192—61 XR |
| 2,699,240 | 1/1955 | Hilb | 192—61 XR |
| 2,833,385 | 5/1958 | Peterson et al. | 192—113.2 |
| 3,139,908 | 7/1964 | Strader. | |
| 3,215,236 | 11/1965 | Pensa | 192—85 |
| 3,207,279 | 9/1965 | Ahlen | 192—61 |

FOREIGN PATENTS 643,196  6/1962  Canada.

MARTIN P. SCHWADRON, Primary Examiner.

C. M. LEEDOM, Assistant Examiner.

U.S. Cl. X.R.

192—61, 87.1, 113.5